3,520,836
PROCESS FOR THE MANUFACTURE OF POROUS COATINGS AND SHEET MATERIALS ON THE BASIS OF POLYVINYLCHLORIDE
Paul Spielau, Spich, Germany, assignor to Dynamit Nobel Aktiengesellschaft, a German corporation
No Drawing. Filed Mar. 7, 1967, Ser. No. 621,738
Claims priority, application Germany, Mar. 8, 1966, D 44,531; Oct. 2, 1965, D 48,338
Int. Cl. C08f 47/10
U.S. Cl. 260—2.5   3 Claims

ABSTRACT OF THE DISCLOSURE

Process for manufacturing porous coatings and sheet materials suitable for use, for example, as synthetic leathers which comprises forming a film with or without an underlying support from mixtures composed of polyvinylchloride polymers or coplymers which have been obtained by emulsion polymerization, having an average grain size of 30 to 100 microns and a packed density of at least 0.5 g./ml., a plasticizer and about 2 to 15 percent of an aqeuous ammonium carbonate or bicarbonate solution and optionally such materials as fillers and coloring agents. The ammonium carbonate or bicarbonate is used in an amount of 0.2 to 3 weight percent and preferably 0.5 to 1.5 weight percent referred to the solids present in the mixture. The spread mixture, as for instance, the mixture spread on a support such as a sheet of textile is then set at an elevated temperature.

---

This invention relates to porous coatings and sheet materials on the basis of polyvinylchloride and methods for their production. More particularly, this invention relates to porous coatings and sheet materials on the basis of polyvinylchloride permeable to air and moisture and accordingly suitable for use as synthetic leathers and methods for their production.

Artificial leather prepared from plasticized polyvinylchloride, has been in use for some time and has the disadvantage, as compared with leather derived from animal hides, that it is impermeable to air and water vapor. Attempts have been made to eliminate this disadvantage as for example by incorporating additives into the sheet material and then washing them out again, or by mechanically piercing the sheet. A disadvantage of the former procedure is that relatively expensive washing processes are required, and of the latter procedure, that products are obtained which are not the equal in quality of natural leather as regards permeability. Further a sufficiently fine pore structure cannot be imparted to the sheet by adding to polyvinylchloride having average grain sizes of about 0.1 to 3 microns (such as used in the preparation of coating compositions) foaming or pore forming agents which produce gases under the action of temperature, such as, for example, azodicarbonamide or aziosobutyronitrile.

According to one known process (U.S. Pat. 2,864,777), a porous film is obtained by working polyvinylchloride having an average grain size of 0.2 to 2 microns with a plasticizer and water. According to other methods (U.S. Pats. 2,946,095 and 2,960,728), aqueous aminoplasts or phenoplasts and water-binding fillers are used. In this manner, sheets are obtained which, for example, permit the passage of up to 200 liters of air per hour per square decimeter in thicknesses of 0.38 mm. The determination of air-permeability gives no indication of the quality of a porous sheet material, since it does not allow for any distinction between a sheet having fine pores uniformly distributed over a given area and a sheet having few large pores irregularly distributed over the same area. Therefore the decision as to the quality of a porous sheet material must be based not only on air-permeability but also on water-permeability or ink-permeability.

According to another patent (German Pat. 967,403), a porous sheet material is manufactured by adding polyvinylchloride, in a mixture with a plasticizer and a filler, an organic material that is capable of swelling, such as starch, and also, if desired, a foaming agent. The sheet thus produced, however, has the disadvantage that it has a sticky and consequently easily soiled surface.

In contrast to polyvinylchloride having an average grain size of about 0.1 to 3 microns, polyvinylchloride having an average grain size of about 30 to 100 microns have hitherto not assumed any importance in the art of fabric coating because of their substantially inferior flow properties. This is apparent from the following table in which time measurements which were obtained using a Ford pouring beaker DIN 53,211 having an 8 mm. nozzle are set out.

TABLE 1

| PVC (tradename) | Manufacturer | Grain size, microns | Ford Seconds PVC 70 DOP[1] 30 | 65 35 | 60 40 | 55 parts 45 parts |
|---|---|---|---|---|---|---|
| Vinnol P100/70 | 1 | 0.2–5 | 152 | 94 | 54 | 28 |
| Hostalit PVP | 2 | 0.2–5 | 486 | 151 | 65 | 32 |
| Vestolit B7021 | 3 | 0.2–5 | 579 | 244 | 148 | 48 |
| Geon 121 | 4 | 0.2–5 | 3,600 | 488 | 107 | 29 |
| E60 | 5 | [2] 30–100 | [3] | [3] | 408 | 208 |
| E67 | 5 | [2] 30–100 | [3] | [3] | 3,600 | 539 |
| E69 | 5 | [2] 30–100 | [3] | [3] | 3,600 | 333 |

[1] DOP=Dioctylphthalate.
[2] All grain-sizes between these limits can be present.
[3] Did not flow.

1 Wacker-Chemie, see Wacker-prospect Nr. 2603.639 C. K.
2 Farbw. Hoechst.
3 Chem. Werke Hüls, see sheet-collection "Vestolit", July 1966.
4 Goodrich, U.S.A, see "Geon-prospect", fourth edition, Jan. 1957.
5 Dynamit Nobel, the numbers of PVL E60, E67 and E69 are "K-Werte" a unit of measurement of the viscosity in an opganic solvent.

This class of emulsion polyvinylchloride which forms coating compositions poorly if at all are the basis of the coating compositions in accordance with the invention.

It is, therefore, an object of the present invention to provide a method of improving the properties of emulsion produced polyvinylchlorides having a grain size of from 30 to 100 microns wherein the coatings or sheet materials produced therefrom, are greatly improved as compared to prior coatings or sheet materials.

Another object of the invention is to provide a method for treating emulsion produced polyvinylchlorides having a grain size of from 30 to 100 microns as to improve the permeability to water and air of the sheet materials produced therefrom.

A further object of the invention is to provide a method for treating emulsion produced polyvinylchlorides having a grain size of from 30 to 100 microns whereby finely and uniformly porous sheet materials are produced.

Various other objects, advantages and features of the invention will become apparent to one skilled in the art upon consideration of the accompanying disclosure.

The instant invention resides in a process which eliminates or substantially minimizes the above-discussed problems with a resulting production of porous coatings and sheet materials having a satisfactory permeability to air and water i.e., moisture. Broadly speaking, the process comprises the manufacture of porous coatings or sheet materials, such as artificial leather from water-containing coating compositions on the basis of polyvinylchloride or copolymers thereof, by forming the coating compositions or mixtures from polyvinylchloride polymers produced by the emulsion polymerisation process having an average grain size of 30 to 100 microns and a packed density of more than 0.5 g./ml., plasticizers and, optionally, fillers and colorants and approximately 2 to 15 percent aqueous solutions of ammonium carbonate or ammonium bicarbonate, wherein the said carbonates amount to 0.2 to 3 percent, and preferably 0.5 to 1.5 percent of the weight of the solids in the composition, and the greater the concentration in the aqueous solution, the greater the amount of carbonates that must be used, and spreading the composition into films possibly upon a supporting material in a known manner and setting the resulting film or coating at an elevated temperature.

In the case of the polyvinylchlorides as used hitherto in the fabric coating art, the ease of flow and the slowness of the increase in viscosity caused a skin to form on the surface which to a great extent prevented the emergence of the water vapor and thus resulted in non-uniform bubble formation in the sheet. But in the case of the polyvinylchlorides as used according to the invention the viscosity increases rapidly and no skin forms on the surface during the evaporation of the water, so that the water vapor escapes readily. In this manner, non-uniform bubble formation is prevented and a finely porous sheet is produced.

The following table represents a comparison of the viscosity increase and the packed densities of the various types of polyvinylchlorides. In part (a) of the table the types of polyvinylchlorides customarily used in fabric-coating are set out while in part (b) the polyvinylchloride compositions according to the invention are set out.

TABLE 2

| PVC (tradename) | Manufacturer | Grain sizes, microns | Time req'd for increase in viscosity, min. | Packed densities, g./ml. |
| --- | --- | --- | --- | --- |
| Part (a): | | | | |
| Hostalit PVP | Farbwerke Hoechst | 0.2-5 | 24 | 0.45 |
| Geon 121 | Goodrich, U.S.A. | 0.2-5 | 24 | 0.42 |
| Breon 121 | British Geon | 0.2-5 | 17 | 0.39 |
| Vinnol P-100/70 | Wacker-Chemie | 0.2-5 | 15 | 0.38 |
| Vestolit E7001 | Chemische Werke Huls | 0.2-5 | 14 | 0.43 |
| Vestolit B7021 | do | 0.2-5 | 9.5 | 0.33 |
| Part (b): | | | | |
| E69 | Dynamit Nobel | 30-100 | 7 | 0.64 |
| E67 | do | 30-100 | 6 | 0.61 |
| E60 | do | 30-100 | 1 | 0.66 |

The entirely unexpected and surprising reduction in the viscosity by the use of aqueous solutions of ammonium carbonate or ammonium bicarbonate as compared with the use of plain water is important as regards the fabric coating art.

The use of the known foaming or pore forming agents, such as azodicarbonamide and the like, which are known by the commercial name of "Porofores" (Mfg.: Farbenfabriken Bayer, Leverkusen), and which can be used in combination with water, results in a reduction of viscosity however the nature of the viscosity reduction is not of the kind that is desirable for coating fabrics with doctor blades and the like.

In accordance with the invention those plasticizers can be used which are customarily used with polyvinylchloride, such as for example phthalic acid, sebacic acid, fumaric acid ester and/or phosphoric acid ester.

The polyvinylchlorides used according to the invention can be either homopolymers or copolymers obtained using vinyl acetate, vinyl propionate, vinylidene chloride, and acrylic acid and/or methacrylic acid derivatives, for example.

Chalk, cellulose, kaolin, asbestos, titanium dioxide and other known pigments can be added, for example, as fillers.

The densities of the sheet materials made according to the invention amount to from 0.6 to 0.9 g./ml., depending on the plasticizer and filler content.

The porous films manufactured in accordance with the invention can be self-supporting or can be supported on textiles, mattings, paper or wire fabrics and are produced by spreading the compositions either onto an acceptable surface or support as above set out using a squeegee or doctor blade of by "reverse roll coating." The compositions can also be used, for example, for coating the back of carpets, for wall coverings that can "breathe," for intermediate layers in floor coverings made by the calendering process, or as seal in crown caps for bottles.

A more comprehensive understanding of the invention can be obtained by referring to the following illustrative examples which are not intended, however, to be unduly limitative of the invention.

EXAMPLE 1

Sheets were produced by casting 1 millimeter-thick layers of a mixture having the following composition:

100 parts[1] of PVC E-69
100 parts of dioctylphthalate
1 part of nonylphenolpolyglycol ether
4 parts of epoxidized soybean oil with the following variations:

(1) Without water
(2) With 20 parts of water
(3) With 20 parts of 10 percent aqueous solution of $(NH_4)_2CO_3$.

[1] All parts are parts by weight.

The mixture was allowed to set in a drying cabinet at a temperature of from 150 to 160° C.

From Table 1, which follows, it can be seen that the addition of ammonium carbonate has little or no influence on the density of the sheet produced from the mixture, and that for the most part it results in an opening of the pores, as shown in detail below.

Table 1

Leavening or pore forming agent:                 Density (g./ml.)
  (1) Without water _____ 1.06
  (2) With 20 parts water _____ 0.82
  (3) With 20 parts of a 10 percent aqueous $(NH_4)_2CO_3$ solution _____ 0.82

EXAMPLE 2

A mixture having the following compositions:

| | Parts |
| --- | --- |
| PVC E-69 | 100 |
| Dioctyl phthalate | 90 |
| Nonylphenol polyglycol ether | 2 |
| Epoxidized soybean oil | 4 |

| | Parts |
|---|---|
| Ivory black | 1 |
| China clay X-1 | 40 |
| 10 percent aqueous ammonium carbonate solution | 20 | and a further mixture containing, in place of the ammonium carbonate solution, the corresponding amount of water, had the following viscosities as measured in the Haake "Viskotester" (Mfr.: Haake, Medingen), Mod. VT-23, with the spindle E-1000, at 5.8 r.p.m.

| | Poises |
|---|---|
| Ammonium carbonate solution | 600 |
| Water | 30,000 |

A mixture of the above composition was applied by spreading onto linen at the rate of 450 g./m.² From Table 2 the effect of amonium carbonate on the permeability of supported artificial leather can be seen. The table also shows that poor permeability is obtained by the addition of solid amonium carbonate.

TABLE 2

| PVC, type | Additive | Air permeability [1], 1./h./100 cm.² | Ink permeability |
|---|---|---|---|
| Hostalit PVP | Water | 0 | 0 |
| PVC E-69 | do | 0 | 0 |
| PVC E-69 | Aqueous (NH₄)₂CO₃ | 620 | 2 |
| PVC E-69 | Solid (NH₄)₂CO₃ | 10 | 1 |

[1] The air permeability was measured at a pressure of 100 millimeters of water column.

In the qualitative testing for water or ink permeability, index numbers of from 0 to 2 were used. The number 2 designates a very good permeability i.e., a drop deposited on the top surface appears in at least the same size on the bottom side. The number 1 indicates that not many pores are open as only at a few points do colored pores appear on the underside. The number 0 designates a condition of no permeability to water or to ink.

EXAMPLE 3

A mixture having the following basic composition:

| | Parts |
|---|---|
| PVC E-69 | 100 |
| Dioctyl phthalate | 90 |
| Nonylphenol polyglycol ether | 2 |
| Epoxidized soybean oil | 4 |
| Ivory black | 0.5 | following the addition thereto of various amounts of aqueous ammonium carbonate and China clay was spread upon linen and tested for permeability. The coating as applied weighed 450 g./m.²

In Table 3 there are set out the air and ink permeabilities obtained. The table indicates that the addition of a 5 percent ammonium carbonate solution does not result in any air or ink permeability.

TABLE 3

| 20 parts aq. (NH₄)₂CO₃ soln. | China clay parts | Air permeability, 1./h./100 cm.² | Ink permeability |
|---|---|---|---|
| 15% solution | 20 | 1,865 | 2 |
| Do | 34 | 1,520 | 2 |
| Do | 40 | 1,440 | 2 |
| 10% solution | 20 | 805 | 2 |
| Do | 34 | 550 | 2 |
| Do | 40 | 620 | 2 |
| 5% solution | 20 | 0 | 0 |
| Do | 34 | 0 | 0 |
| Do | 40 | 0 | 0 |

EXAMPLE 4

When leavening or pore forming agents such as azodicarbonamide or azoisobutyronitrile, which are known commercially as Porofores, are used in combination with water and PVC compositions of the type which are here shown as being particularly suitable, open-pore sheet materials are also obtained, however, the technically desirable reduction of the viscosities is entirely lacking. Table 4 which follows illustrates this fact.

A composition consisting of:

| | Parts |
|---|---|
| PVC E-69 | 50 |
| Dioctylphthalate | 45 |
| Nonylphenol polyglycol ether | 1 |
| Epoxidized soybean oil | 2 |
| Chalk | 17 |
| Ivory black | 0.5 | and the additional materials as shown in Table 4, were spread to form a sheet.

TABLE 4

| Water, parts | Azoisobutyric acid nitrile, parts | Weight per sq. m., grams | Density, g./ml. | Air permeability, 1./h./100 cm.² | Ink permeability |
|---|---|---|---|---|---|
| | 1 | 960 | 1.13 | 28 | 1 |
| 10 | | 810 | 1.09 | 5 | 1 |
| 10 | 1 | 860 | 0.96 | 130 | 2 |

EXAMPLE 5

A mixture consisting of:

| | Parts |
|---|---|
| PVC E-69 | 1000 |
| Dioctyl phthalate | 900 |
| Aqueous 15% solution of NH₄HCO₃ | 200 |
| Nonylphenol polyglycol ether | 20 |
| Epoxidized soybean oil | 40 |
| Ivory black | 10 |
| China clay X-1 | 400 | was applied with a steel spreader to a satin fabric having a weight of 200 g. per square meter. The weight of the coating amounted to 430 g./m.² The setting of the mixture was carried out in a tunnel using in combination hot air infrared heating at 150 to 160° C., with a time of stay of 50 sec. The measured air-permeability of this material was 1540 1./h. per 100 cm.²; the ink permeability was 2.

EXAMPLE 6

A mixture consisting of:

| | Parts |
|---|---|
| PVC E-60 | 500 |
| Dioctyl phthalate | 450 |
| Aqueous 15% solution of (NH₄)₂CO₃ | 100 |
| Nonylphenol polyglycol ether | 10 |
| Epoxidized soybean oil | 20 |
| Ivory black | 5 |
| China clay X-1 | 200 | was applied to fabric samples in the same manner as described in Example 5. The coating amounted to 560 g. per sq. m. The air permeability as determined on these specimens amounted to 1480 1./h. per 100 sq. cm.; the ink-permeability was 2.

EXAMPLE 7

The same procedure was followed as described in Example 6, but in this instance chalk was used as the filler instead of China clay. At a coating weight of 400 g./m.², the air-permeability was determined to be 920 1./h. per 100 sq. cm., and the ink-permeability was 2.

What is claimed is:

1. A macro-porous polyvinylchloride sheet material having a density of about 0.6 to 0.9 gram per milliliter made by forming a mixture consisting essentially of polyvinylchloride particles prepared by emulsion polymerization having an average grain size of about 30 to about 100 microns and a packed bulk density of at least 0.5 gram milliliter, a plasticizer for said polyvinylchloride and an aqueous solution of ammonium carbonate or bicarbonate which is about a 2 to 15 weight percent solution wherein the carbonate or bicarbonate of said solution is present in said mixture in an amount of about 0.2 to 3 weight percent based upon the total solids in said mixture; spreading said mixture into the form of a sheet or film; and setting said mixture at an elevated temperature.

2. The product as claimed in claim 1 wherein said mixture has the following composition:

| | Parts |
|---|---|
| Polyvinylchloride | 1000 |
| Dioctyl phthalate | 450 |
| Aqueous 15 percent solution of $(NH_4)_2CO_3$ | 100 |
| Nonylphenol polyglycol ether | 10 |
| Expoxidized soybean oil | 20 |
| Ivory black | 5 |
| China clay | 200 |

3. The product claimed in claim 1 having an air permeability of at least about 1480 liters per hour per 100 square centimeters and an ink permeability of 2.

References Cited

UNITED STATES PATENTS

| 2,809,398 | 10/1957 | Stiehl et al. | 264—54 |
| 2,875,088 | 2/1959 | Stiehl et al. | 264—54 |
| 3,198,773 | 8/1965 | Stoloff | 260—92.8 |

DONALD E. CZAJA, Primary Examiner

D. J. BARRACK, Assistant Examiner

U.S. Cl. X.R.

260—23, 12.8, 41; 264—54

PO-1050
(5/69)

UNITED STATES PATENT OFFICE
CERTIFICATE OF CORRECTION

Patent No. 3,520,836                                    Dated July 21, 1970

Inventor(s)   PAUL SPIELAU

It is certified that error appears in the above-identified patent and that said Letters Patent are hereby corrected as shown below:

Column 1, line 9, "D 44,531" should be --D 49,531--; column 1, line 57, "aziosobutyronitrile" should be --azoisobutyronitrile--; column 3, Table 2, under the heading "Manufacturer" (5th item) "Huls" should be --Hüls-- ; column 4, line 9, "of" should be --or--; column 4, line 70, "compositions" should be --composition--; column 5, line 19, "amonium" should be --ammonium--; column 5, line 20, after "carbonate" insert --in absence of water--

SIGNED AND
SEALED
OCT 20 1970

(SEAL)
Attest:

Edward M. Fletcher, Jr.
Attesting Officer

WILLIAM E. SCHUYLER, JR.
Commissioner of Patents